United States Patent
Fertig et al.

(10) Patent No.: US 11,193,750 B1
(45) Date of Patent: Dec. 7, 2021

(54) DYNAMIC OPTICAL INTERFEROMETER LOCKING USING ENTANGLED PHOTONS

(71) Applicant: Honeywell International Inc., Morris Plains, NJ (US)

(72) Inventors: Chad Fertig, Bloomington, MN (US); David Campagna, Westminster, CO (US); Karl D. Nelson, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/936,294

(22) Filed: Jul. 22, 2020

(51) Int. Cl.
  *G01B 9/02* (2006.01)
  *G01B 11/04* (2006.01)
  *G01S 19/23* (2010.01)

(52) U.S. Cl.
  CPC ........ *G01B 9/02007* (2013.01); *G01B 11/043* (2013.01); *G01S 19/23* (2013.01); *G01B 2290/70* (2013.01)

(58) Field of Classification Search
  CPC .................................................. G01B 9/02048
  See application file for complete search history.

(56) References Cited

U.S. PATENT DOCUMENTS

| | | | |
|---|---|---|---|
| 4,004,098 A | 1/1977 | Shimasaki | |
| 5,475,520 A | 12/1995 | Wissinger | |
| 6,590,685 B1 | 7/2003 | Mendenhall et al. | |
| 7,286,444 B1 * | 10/2007 | Bahder | G04G 7/02 250/336.1 |

(Continued)

FOREIGN PATENT DOCUMENTS

| CN | 104407321 A | 3/2015 |
|---|---|---|
| CN | 106848827 A | 6/2017 |

(Continued)

OTHER PUBLICATIONS

Kim, H. et al. "Two-photon interference of polarization-entangled photons in a Franson interferometer". Scientific Reports, 7, 5772, Jul. 18, 2007, pp. 1-13. (Year: 2017).*

(Continued)

*Primary Examiner* — Michael A Lyons

(74) *Attorney, Agent, or Firm* — Fogg & Powers LLC

(57) ABSTRACT

Systems and methods for dynamic optical interferometer locking using entangled photons are provided. In certain embodiments, a system includes an optical source for generating a pair of photons. Also, the system includes first and second emitter/receivers that emit first and second photons towards first and second remote reflectors and receive reflected first and second photons along first and second optical paths. Additionally, the system includes a mode combiner for combining the reflected first photon and second photon into a first and second output port. Moreover, the system includes a coarse adjuster that performs coarse adjustments and a fine adjuster that performs fine adjustments to the first and second optical paths. Further, the system includes a plurality of photodetectors that detect photons from the first and second output ports. Additionally, the system includes a processor that controls the coarse and fine adjustments based on received signals from the photodetectors.

20 Claims, 8 Drawing Sheets

(56) References Cited

U.S. PATENT DOCUMENTS

| | | | |
|---|---|---|---|
| 7,324,211 B2 | 1/2008 | Tsujita | |
| 7,359,064 B1 | 4/2008 | Bahder | |
| 9,784,561 B2 | 10/2017 | Jiang et al. | |
| 10,187,162 B2 | 1/2019 | Li et al. | |
| 2005/0199812 A1 | 9/2005 | Shih | |
| 2009/0134310 A1 | 5/2009 | Goodno | |
| 2009/0290162 A1* | 11/2009 | Erkmen | G01B 9/02018 356/450 |
| 2010/0123091 A1 | 5/2010 | Gilbert et al. | |
| 2013/0176573 A1* | 7/2013 | Bovino | G01B 9/02014 356/491 |
| 2015/0077734 A1 | 3/2015 | Habif | |
| 2019/0349094 A1 | 11/2019 | Santra et al. | |
| 2020/0382219 A1* | 12/2020 | Innes | H04W 12/04 |

FOREIGN PATENT DOCUMENTS

| | | |
|---|---|---|
| CN | 109547144 A | 3/2019 |
| CN | 109586907 A | 4/2019 |
| CN | 209170391 U | 7/2019 |
| WO | 2020140850 A1 | 7/2020 |

OTHER PUBLICATIONS

Lyons, Ashley et al. "Attosecond-resolution Hong-Ou-Mandel interferometry". Science Advances, vol. 4, No. 5, May 4, 2018, pp. 1-8. (Year: 2018).*

Fertig, Chad et al. "Integrated Photonics Source and Detector of Entangled Photons", U.S. Appl. No. 16/803,841, filed Feb. 27, 2020, pp. 1-34, Published: US.

Hayat et al., "Theory of photon coincidence statistics in photon-correlated beams", Optics Communications 6067, Jul. 9, 1999, pp. 1-13, Elsevier Science B.V.

Puckett, Matthew W. et al. "Integrated Photonics Mode Splitter and Converter", U.S. Appl. No. 16/803,820, filed Feb. 27, 2020, pp. 1-31, Published: US.

Puckett, Matthew W et al. "Integrated Photonics Vertical Coupler", U.S. Appl. No. 16/803,831, filed Feb. 27, 2020, pp. 1-31, Published: US.

U.S. Patent and Trademark Office, "Notice of Allowance", U.S. Appl. No. 16/936,282, dated Jul. 28, 2021, pp. 1 through 19, Published: US.

U.S. Patent and Trademark Office, "Office Action", U.S. Appl. No. 16/936,295, dated Oct. 14, 2021, pp. 1 through 24, Published: US.

European Patent Office, "Extended European Search Report from EP Application No. 21172509.8", from Foreign Counterpart to U.S. Appl. No. 16/936,295, dated Sep. 28, 2021, pp. 1 through 8, Published: EP.

Quan et al "Demonstration of quantum synchronization based on second-order quantum coherence of entangled photons", Scientific Reports, Jul. 25, 2016, pp. 1 through 8, www.nature.com/scientificreports.

Valencia et al "Distant clock synchronization using entangled photon pairs", Applied Physics Letters, Sep. 27, 2004, pp. 2655 through 2657, vol. 85, No. 13, American Institute of Physics.

Fertig, Chad et al., "Direct Measurement of Imbalanced Optical Paths Using Entangled Photons", U.S. Appl. No. 16/936,295, filed Jul. 22, 2020, pp. 1 through 37, Published: US.

Fertig, Chad et al., "Dynamical Locking of Optical Path Times Using Entangled Photons", U.S. Appl. No. 16/936,282, filed Jul. 2, 2020, p. 1 through 50, Published: US.

Aguilar et al., "Robust interferometric sensing using two-photon interference", Jul. 10, 2020, pp. 1 through 10.

European Patent Office, "Extended European Search Report from EP Application No. 21172506.4," from Foreign Counterpart to U.S. Appl. No. 16/936,294, dated Sep. 27, 2021, pp. 1 through 8, Published: EP.

* cited by examiner

DYNAMIC OPTICAL INTERFEROMETER LOCKING USING ENTANGLED PHOTONS

STATEMENT REGARDING FEDERALLY SPONSORED RESEARCH OR DEVELOPMENT

This invention was made with Government support under 15-C-0285. The Government has certain rights in the invention.

BACKGROUND

As satellites orbit the earth, they may communicate with one another to synchronize the clocks onboard different satellites. Frequently, to precisely synchronize clocks, satellites use interferometric methods to establish the relative separations of the satellites. The satellites can use information regarding the relative separations of neighboring satellites to communicate information with one another that includes accurate time and frequency information acquired from atomic clocks. The atomic clocks are used for the distribution of international time, to control the frequencies of broadcasted signals, and in global navigation satellite systems (GNSS) such as the global positioning system (GPS), GLONASS, BeiDou, or Galileo. In some satellite constellations, the relative separations of the satellites may not be knowable to a precision that permits the synchronization of the atomic clocks to the desired levels.

SUMMARY

Systems and methods for dynamic optical interferometer locking using entangled photons are provided. In certain embodiments, a system includes an optical source for generating a pair of simultaneously produced photons. Also, the system includes a first emitter/receiver that emits a first photon in the pair of photons towards a first remote reflector and receives a reflected first photon along a first optical path. Further, the system includes a second emitter/receiver that emits a second photon in the pair of photons towards a second remote reflector and receives a reflected second photon along a second optical path. Additionally, the system includes a mode combiner for combining the reflected first photon and the reflected second photon into a first output port and a second output port. Moreover, the system includes a coarse adjuster that performs coarse adjustments to the first optical path and the second optical path. The system also includes a fine adjuster that performs fine adjustments to the first optical path and the second optical path. Further, the system includes a plurality of photodetectors that detect photons from the first output port and photons from the second output port. Additionally, the system includes a processor that executes executable code that causes the processor to control the coarse adjustments and the fine adjustments based on received signals from the plurality of photodetectors, wherein the coarse adjustments are greater than the fine adjustments.

DRAWINGS

Understanding that the drawings depict only some embodiments and are not, therefore, to be considered limiting in scope, the exemplary embodiments will be described with additional specificity and detail using the accompanying drawings, in which.

Figure 1:
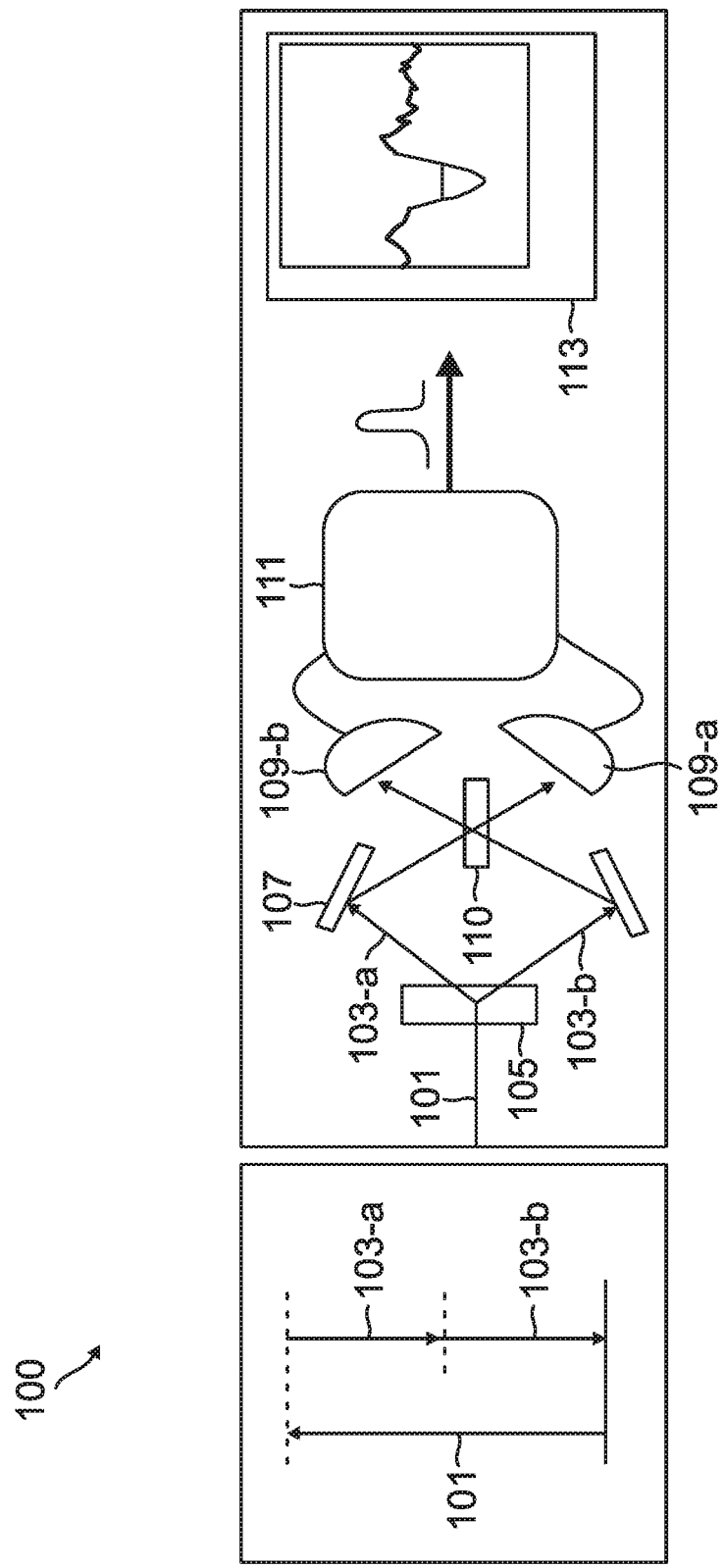
FIG. 1 is a diagram illustrating an exemplary interferometer according to an aspect of the present disclosure.

Per common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

Systems and methods for dynamic optical interferometer locking using entangled photons are described herein. In certain embodiments, a system produces two "twin" twin photons that are "born" at nearly the same instant. The twin photons may be used to effect a real-time lock of two optical pathlengths between a central source and two remote locations (for example, between a source satellite and two remotely located satellites). The source may acquire the lock by projecting the twin photons towards reflectors at the remote locations. The source may receive the reflected photons and recombine them within a Hong-Ou-Mandel (HOM) interferometer. Computational devices connected to the HOM interferometer may observe a dip in the number of coincident photon detections among a plurality of photon detectors when the optical path lengths traveled by the twin photons are substantially equal. Accordingly, the system may use quantum entanglement between the twin photons to determine that the optical path lengths are practically equal.

In exemplary embodiments, two photodetectors may simultaneously receive the twin photons and provide electrical signals to a timing module. The timing module may compare the time of arrival for the twin photons. For example, if the twin photons are simultaneously incident on the photodetectors, the timing module may record a vanishing in the rate of coincident detections of one photon on each detector. Alternatively, if the twin photons are incident on the photodetectors at different times, the timing module may observe a measurable rate of coincident detections of the twin photons. Computation devices may use the information from the timing module to identify the vanishing in the rate of coincident detections to synchronize the optical path lengths between a source and two remote locations.

Frequently, the delays between remote locations and a source location are largely unknown, and the difference between the distances may be largely unknown. Identifying the dip caused by the simultaneous arrival of twin photons may be particularly challenging. For example, the width of the dip may have a sub-picosecond width, and the unknown ranging distance may potentially be large (>10-100 m). The system may account for the wide range of delays by performing multiple adjustments to the optical path lengths on the channels between the source and the remote locations. In particular, the system may make coarse adjustments to one or more optical path lengths to account for the potentially large distance and fine adjustments to identify the dip having the sub-picosecond width.

In some embodiments, to make the coarse adjustment, the system may monitor a continuously acquired stream of time-tagged photon detections to directly measure large differences in optical path length (potentially greater than hundreds of meters) through analysis of time-delay histograms for two detectors of an interferometer. The system may measure the difference in flight times and insert a delay associated with the measured difference into the optical path having the shorter flight time. The system may identify the difference in the optical path lengths traveled by the twin photons without determining the quantum interference. Also, the system may identify the difference in the optical path lengths without precisely measuring the individual flight times of the twin photons.

Further, after the system makes the coarse adjustment, or determines that a coarse adjustment is unnecessary due to the optical path lengths being sufficiently similar, the system may perform a fine adjustment. A computation device may direct the fine adjustment by controlling an optical delay element on one or more of the optical paths. The computation device may send control signals to the optical delay element that cause the optical delay element to make fine, continuous changes to an optical path length. The changes may cause the optical path lengths traveled by the twin photons to become substantially equal such that the system can observe evidence of the HOM dip. As described herein, the system does not merely measure delays and remove the measured delays in subsequent data processing. Also, the system may monitor the optical path lengths and make adjustments as needed to maintain synchronization of the different clocks.

FIG. 1 is a diagram illustrating a system 100 for a Hong-Ou-Mandel (HOM) interferometer. Systems described herein may incorporate a HOM interferometer. As used herein, a HOM interferometer is a device that uses the HOM effect to measure characteristics for two received photons. The system 100 may produce a pump photon 101. The system 100 may split the pump photon into two twin photons 103 (referred to separately herein as photons 103-A and 103-B). For example, the pump photon 101 may be produced by a laser source that produces photons having wavelengths of 405 nm.

In certain embodiments, the pump photon 101 is split into twin photons 103 that are guided through optical structures for recombination. For example, the pump photon 101 is split by optical structure 105 into twin photons 103-a and 103-b. The twin photons 103-a and 103-b may each have a wavelength that is twice the wavelength of the pump photon 101 (i.e., where the pump photon could have a wavelength of 405 nm, the twin photons 103-a and 103-b may each have a wavelength of 810 nm). Additionally, the system 100 may include guiding optics 107 that guide the twin photons 103-a and 103-b to detectors 109 for the reception of the twin photons 103-a and 103-b. For example, a detector 109-a may receive and detect the twin photon 103-a, and the detector 109-b may receive and detect the twin photon 103-b.

In some embodiments, when the detectors 109 receive the associated twin photons 103-a and 103-b, the detectors 109 may provide the signals to a timing module 111, where the timing module 111 compares the times of arrival of the electrical signals, to determine the degree of coincidence of arrival. The timing module 111 may attempt to identify a delay where the coincidence rate of the signals provided by the photodetectors dips towards zero. For example, the coincidence rate of the signals provided by the photodetectors may drop towards zero when the twin photons 103 overlap substantially perfectly in time. This drop towards zero is known as the HOM dip illustrated in the trace graph 113. The dip occurs when the two twin photons 103 are substantially identical in all properties and recombine at the splitter 110. When the photons become distinguishable, the HOM dip disappears.

The system 100 and other systems described herein may be used within larger systems for synchronizing atomic clocks. For example, HOM interferometry may provide a femtosecond-precise time base that is distributed securely across a constellation of LEO or MEO satellites. One advantage of the systems and devices disclosed herein is the use of arrays of phase synchronized receivers. Phase synchronized receivers distributed over a large area may improve the resolution of images acquired by the satellites by creating a large aperture out of the dispersed collection of smaller apertures, thereby beating the diffraction limit of the individual smaller apertures. The ultra-high-resolution imaging could support a variety of missions ranging from sparse aperture imaging to geolocation to ground moving target indication. An additional advantage of the system includes real-time computational interferometry. For example, return signals may be synthesized during acquisition and can achieve a better signal-to-noise ratio on images than can post-collection averaging. Further advantages may include active beam forming, where a power of a pulse may be concentrated into an area smaller than could be achieved with the angular resolution of any one satellite's antenna. Active beam forming would not only boost the signal-to-noise ratio of the returned signals but also would reduce signal spillover and time-on-target, thus increasing the covertness of implementing processes. Also, arrays of receivers are more resilient to single-point attacks and can be configured to be optimized for different, specific mission profiles.

As described above, the identification of a HOM dip and synchronization of different satellites using HOM interferometry has many different applications. However, these applications may be dependent upon balancing the different optical path lengths of the interferometer to within the sub-millimeter scale. Balancing the different optical path lengths of remotely located satellites to high levels of precision may be difficult. Systems and methods described herein implement both coarse and fine adjustments to the optical path lengths between the different satellites (or other remotely located devices) to balance the optical path lengths within the sub-millimeter level.

Figure 2:
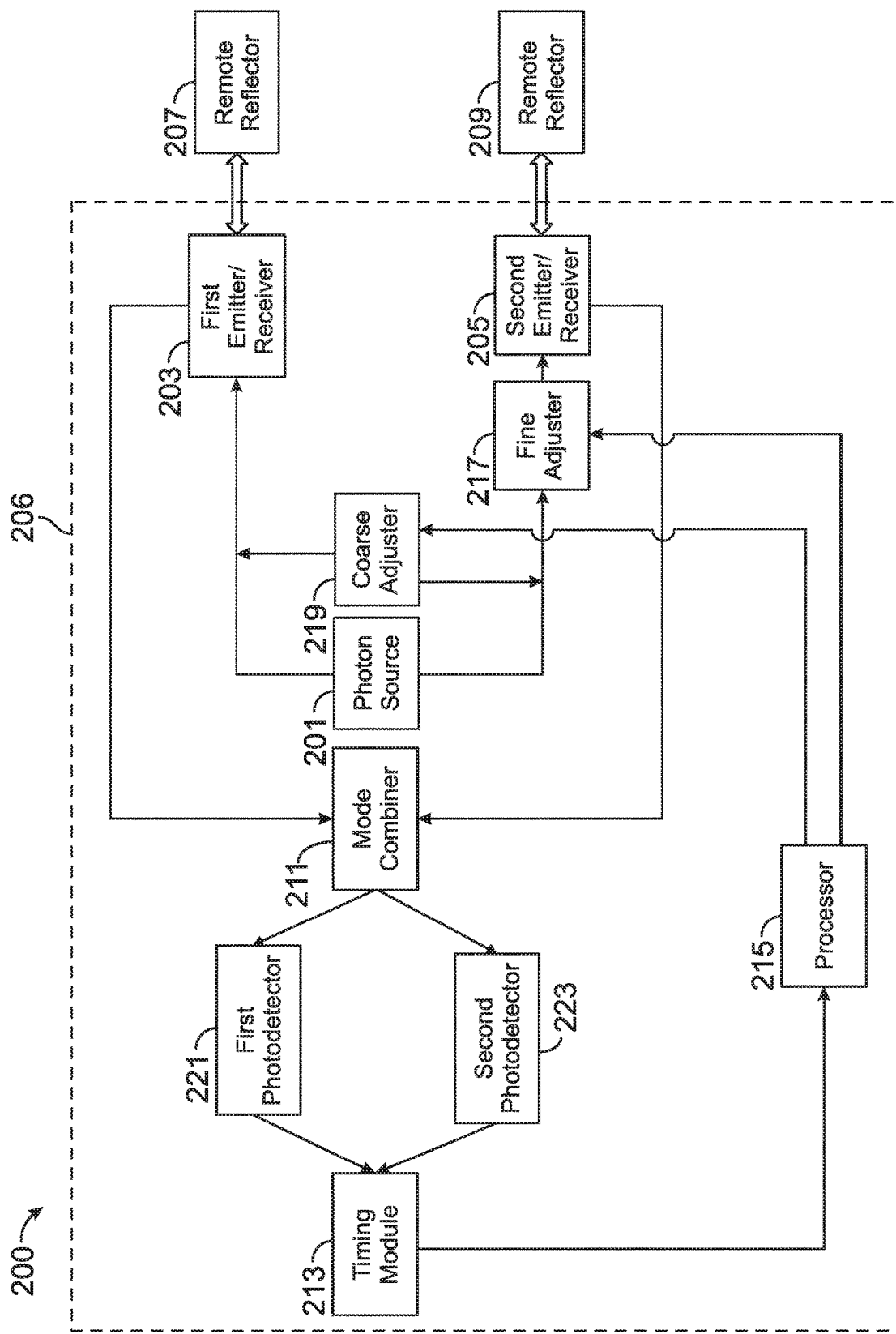
FIG. 2 is a block diagram illustrating an exemplary system for dynamic optical interferometer locking using entangled photons according to an aspect of the present disclosure.

FIG. 2 is a block diagram of a balancing system 200. The balancing system 200 may use various components to balance different optical path lengths between an optical source and receiver 206 and separate remote reflectors 207 and 209. Additionally, the balancing system 200 may be part of a balancing network that can synchronize time between multiple sources. Balancing networks are described in greater detail below. The optical source and receiver 206 may emit a first twin photon towards the remote reflector 207 and a second twin photon towards the remote reflector 209. In certain networks, the optical source and receiver 206 may be a satellite, and the remote reflectors 207 and 209 may be different remotely located satellites. Alternatively, the optical source and receiver 206 may be a device capable of emitting twin photons, and the remote reflectors 207 and 209 may be separate devices capable of receiving the twin photons and reflecting them towards the optical source and receiver 206.

In certain embodiments, the optical source and receiver 206 may include a photon source 201. The photon source 201 may be a device that generates a photon and splits the photon into two twin photons. The photon source 201 may be a laser generating device or other devices capable of generating the twin photons. For example, the photon source 201 may produce correlated or entangled photon pairs using spontaneous parametric down-conversion (SPDC). When the photon source 201 generates the twin photons, the photon source may provide a first twin photon to a first emitter/receiver 203 and a second twin photon to a second emitter/receiver 205. The first emitter/receiver 203 and the second emitter/receiver 205 may be devices that emit and receive photons. For example, an emitter/receiver may be a combination of optical devices that can focus and direct a photon towards a respective remote reflector and also receive a photon reflected from the respective remote reflector. For example, the first emitter/receiver 203 may emit a photon towards the remote reflector 207. Also, when the remote reflector 207 reflects the photon towards the optical source and receiver 206, the first emitter/receiver 203 may receive the reflected photon. Similarly, the second emitter/receiver 205 may emit a photon towards the remote reflector 209. Also, when the remote reflector 209 reflects the photon towards the optical source and receiver 206, the second emitter/receiver 205 may receive the reflected photon.

In some embodiments, when the first emitter/receiver 203 receives a first twin photon that was reflected from the remote reflector 207 and the second emitter/receiver 205 receives a second twin photon that was reflected from the remote reflector 209, the first emitter/receiver 203 and the second emitter/receiver 205 may provide the received twin photons to a mode combiner 211. In certain implementations, the first emitter/receiver 203 and the second emitter/receiver 205 may function as multiple devices, where photons are emitted by a first type of device and received by a second type of device. Alternatively, the first emitter/receiver 203 and the second emitter/receiver 205 may include a device (like a circulator) that receives the respective photons for emission on a first port, emits the photon towards and receives the photon from a remote reflector on a second port, and provides the received photon to the mode combiner 211 on a third port.

In some embodiments, the mode combiner 211 may include multiple outputs directed onto photodetectors 221 and 223. The photodetectors may convert the received light into electrical signals and provide the electrical signals to a timing module 213. The timing module 213 (similar to the timing module 111 in FIG. 1) may combine the received electrical signals and perform interferometry on the received electrical signals. The timing module 213 may then provide data representing the results of the coincidence of the arrival of electric signals to the timing module 213 within the optical source and receiver 206.

In further embodiments, the timing module 213 may be a device that can acquire timing information from the interference data. As described herein, timing information may refer to information describing differences in the time from when a first twin photon is incident upon the first photodetector 221, and a second twin photon is incident upon the second photodetector 223. Additionally, the timing information may refer to information regarding the coincidence rate of the twin photons upon the respective photodetectors. The timing module 213 may provide the acquired timing information to a processor 215. In some embodiments, the timing module 213 may be a function executed on the processor 215. In other embodiments, the timing module 213 may be implemented on a separate computation device from the processor 215.

In certain embodiments, the processor 215 may use the timing information from the timing module 213 to identify a delay based on the difference in time of incidence of the twin photons. The processor 215 may use the identified delay to determine adjustments to be made to the path length between the photon source 201 and one or both of the first emitter/receiver 203 and the second emitter/receiver 205 such that the path length between the photon source 201 and the remote reflector 207 and the path length between the photon source 201 and the remote reflector 209 are substantially equal. As used herein, the different optical paths are substantially equal when the coincidence rate of the detections of the twin photons at the first photodetector 221 and the second photodetector 223 dips towards zero, as described above concerning the HOM dip.

In some embodiments, the difference in path length between the photon source 201 and the respective remote reflector 207 and the remote reflector 209 may be substantially larger (>10-100 m) than the largest difference in optical path length for which the paths are substantially equal respecting the HOM dip, such as widths in the sub-millimeter range. Accordingly, to achieve precise equalization of path lengths for a wide range in initial path length differences, the processor 215 may calculate two different adjustments for the optical path lengths. In particular, the processor 215 may determine adjustments that control actuators in a coarse adjuster 219 and a fine adjuster 217. The coarse adjuster 219 may be a device capable of making large changes to the different optical path lengths, and the fine adjuster 217 may be a device that facilitates small changes to the different optical path lengths.

When the processor 215 determines that the difference between the optical path lengths is outside the range of possible adjustments for the fine adjuster 217, the processor 215 may direct the coarse adjuster 219 to change the optical path lengths such that the difference between the optical path lengths is within the range of adjustments that can be made by the fine adjuster 217. When the coarse adjuster 219 adjusts the different optical path lengths such that the difference in the optical path lengths is within the range of adjustments for the fine adjuster 217, the processor 215 may direct the fine adjuster 217 to adjust one or more of the optical path lengths to cause the coincidence rate of the detection of the twin photons to dip towards zero.

Additionally, once the processor 215 has directed the coarse adjuster 219 and the fine adjuster 217 to adjust the different optical path lengths to be substantially equal, the processor 215 may monitor the coincidence rate observed by the mode combiner 211 to monitor and adjust the different optical path lengths to account for movement in the remote reflectors 207 and 209 with respect to one another and the optical source and receiver 206. For example, if the coincidence rate of the detection of the twin photons moves out of the dip, the processor 215 may direct the fine adjuster 217 to change the optical path length such that the coincidence rate of the detection of the twin photons substantially remains in the dip. If the adjustment needed to preserve observation of the dip exceeds the range of adjustments for the fine adjuster 217, the processor 215 may direct the coarse adjuster 219 to adjust one or more of the optical path lengths, such that that the fine adjuster 217 can adjust the optical path lengths to preserve observation of the dip.

The processor 215 and/or other computational devices used in the optical source and receiver 206 or other systems and methods described herein may be implemented using software, firmware, hardware, or appropriate combination thereof. The processor 215 and other computational devices may be supplemented by, or incorporated in, specially-designed application-specific integrated circuits (ASICs) or field programmable gate arrays (FPGAs). The processor 215 and other computational devices can also include or function with software programs, firmware, or other computer-readable instructions for carrying out various process tasks, calculations, and control functions used in the methods and systems described herein.

The methods described herein may be implemented by computer-executable instructions, such as program modules or components, which are executed by at least one processor, such as the processor 215. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer-readable instructions. These instructions are typically stored on appropriate computer program products that include computer-readable media used for storage of computer-readable instructions or data structures. Such a computer-readable medium may be available media that can be accessed by a general-purpose or special-purpose computer or processor or any programmable logic device.

Suitable computer-readable storage media may include, for example, non-volatile memory devices including semi-conductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (C.D.s), digital versatile discs (DVDs), Blu-ray discs; or any other media that can be used to carry or store desired program code in the form of computer-executable instructions or data structures.

As described above, the optical source and receiver 206 may capably adjust the different optical path lengths between the photon source 201 and the different remote reflectors 207 and 209 associated with the twin photons produced by the photon source 201 such that the different optical path lengths are substantially equal. Additionally, the optical source and receiver 206 may adjust the different path lengths to account for movement of the remote reflectors 207 and 209 with respect to the photon source 201. Accordingly, the optical source and receiver 206 may be used to synchronize the operations of different satellites associated with the photon source 201 and the remote reflectors 207 and 209 with high precision.

Figure 3:
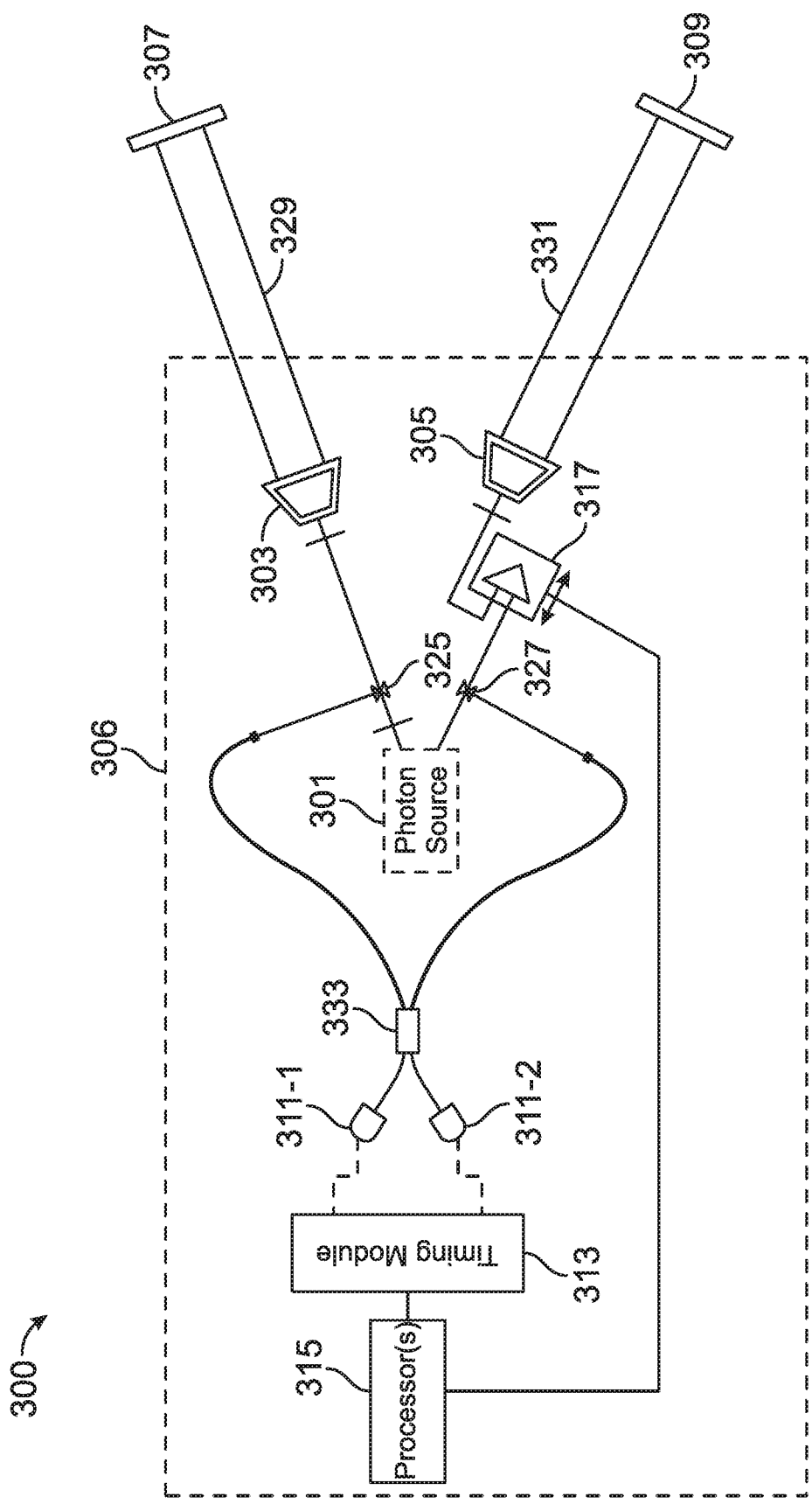
FIG. 3 is a diagram illustrating a system for dynamically locking of optical path synchronicity according to an aspect of the present disclosure.

FIG. 3 is a block diagram of a balancing system 300 that is capable of performing fine adjustments as described above for FIG. 2. As illustrated, the balancing system 300 may include an optical source 306, a remote reflector 307, and a remote reflector 309. The optical source 306 may function similarly as the optical source and receiver 206 described above in FIG. 2. Additionally, the remote reflectors 307 and 309 may function similarly as the remote reflectors 207 and 209. For example, the optical source 306 may emit a first twin photon along a first optical path 329 towards the remote reflector 307 and emit a second twin photon along a second optical path 331 towards the remote reflector 309. The balancing system 300 may adjust the optical path lengths between a photon source 301 and the remote reflectors 307 and 309 to be substantially equal when the difference between the separate optical path lengths is within an adjustment range of a fine adjuster as described above.

In certain embodiments, to perform the fine adjustment, the optical source 306 may include a photon source 301. The photon source 301 is substantially similar to the photon source 201 described above. The photon source 301 may emit twin photons along different optical paths 329 and 331 towards a first emitter/receiver 303 and a second emitter/receiver 305, where the first emitter/receiver 303 and the second emitter/receiver 305 function in a substantially similar manner to the first emitter/receiver 203 and the second emitter/receiver 205. Accordingly, the first emitter/receiver 303 may emit the first twin photon towards the remote reflector 307, after which the remote reflector 307 reflects the first twin photon towards the first emitter/receiver 303. Similarly, the second emitter/receiver 305 may emit the second twin photon towards the remote reflector 309, after which the remote reflector 309 reflects the second twin photon towards the second emitter/receiver 305.

In some embodiments, the first emitter/receiver 303 and the second emitter/receiver 305 may provide the received twin photons to a mode combiner 333. As shown, the first emitter/receiver 303 may receive the first twin photon from the remote reflector 307 and couple the received first twin photon into an optical transmission medium, such as a waveguide or an optical fiber. Similarly, the second emitter/receiver 305 may receive the second twin photon from the remote reflector 309 and couple the first twin photon into a similar optical transmission medium. The respective optical transmission mediums may connect the photon source 301 to the first emitter/receiver 303 and the second emitter/receiver 305. When the emitter/receivers 303 and 305 transmit the received twin photons back towards the photon source 301, polarizing beam splitters 325 and 327 (or other coupling devices) may couple the received twin photons toward the mode combiner 333. The mode combiner 333 may combine the first and second twin photon modes, and provide output ports to photodetectors 311-1 and 311-2.

In exemplary embodiments, a polarizing beam splitter 325 may receive the first twin photon from the first emitter/receiver 303 and couple the first twin photon out of the optical path between the photon source 301 and the first emitter/receiver 303 for coupling into the mode combiner 333. Additionally, a polarizing beam splitter 327 may receive the second twin photon from the second emitter/receiver 305 and couple the second twin photon out of the optical path between the photon source 301 and the second emitter/receiver 305 for coupling into the mode combiner 333. The first photodetector 311-1 and the second photodetector 311-2 may receive the twin photons from the outputs of the mode combiner 333 and provide electrical signals to a timing module 313. The timing module 313 may provide time differences of arrival to a processor 315.

When the balancing system 300 interferes photons in an interferometer, the processor 315 may measure the degree of interference by processing the information on coincident detections of photons at photodetectors 311-1 and 311-2. The timing module 313 and the processor 315 may function in a similar manner as to the timing module 213 and the processor 215 described above in FIG. 2. In particular, the timing module 313 may acquire information regarding the coincidence rate and provide the acquired information to the processor 315. The processor 315 may use the information regarding the coincidence rate to determine whether or not the optical path lengths are substantially similar to one another.

In some embodiments, the processor 315 may control fine adjustments to the lengths of the optical paths 329 and 331 between the photon source 301 and the remote reflectors 307 and 309. To control the optical path lengths, the processor 315 may control a delay element 317 in one of the optical paths. For example, a delay element 317 is shown as being located on the optical path of the second twin photon. Alternatively, the delay element 317 may be on the optical path of the first twin photon. Further, the processor 315 may control separate delay elements on both optical paths between the photon source 301 and the remote reflectors 307 and 309. In controlling the delay element 317, the processor 315 may send signals to the delay element 317 that cause an actuator in the delay element 317 to change or maintain an optical path through the delay element 317.

In certain embodiments, the delay element 317 may be a mechanical translation stage. For example, the processor 315 may send an electrical signal to a mechanical translation stage, where the mechanical translation stage changes the positions of multiple reflective prisms in relation to one another, such that the optical path length through the prisms changes in response to the electrical signal. For example, if the length of the second optical path 331 for the second twin photon is shorter than the length of the first optical path 329 for the first twin photon, the processor 315 may direct the mechanical translation stage in the delay element 317 to increase the optical path length through the prisms. If the length of the second optical path 331 for the second twin photon is longer than the first optical path 329 for the first twin photon, the processor 315 may send an electrical signal that causes the mechanical translation stage in the delay element 317 to reduce the optical path length through the prisms.

As the second optical path 331 for the second twin photon passes through the prisms, the processor 315 may control the length of the second optical path 331 by controlling the optical path length through the prisms of the delay element 317. Additionally, by using a mechanical translation stage to change the positions of the prisms, the processor 315 may adjust the optical path length over a continuous range of distances. Alternatively, the delay element 317 may afford discrete adjustments to the optical path length. For example, the delay element 317 may include optical fiber that is inserted into the path length; piezoelectric transducers wound with optical fiber; mirrors that have an adjustable angle between them to control the number of times light reflects between the mirrors; or any combination of the above.

In some embodiments, the processor 315 may send control signals to the delay element 317 to cause the coincidence rate of the detected twin photons to dip within the HOM dip, indicating that the twin photons are substantially interfering within the interferometer. Initially, to adjust the optical path length to move the coincidence rate into the HOM dip, the processor 315 may assume that the optical path lengths for the twin photons are not equal. Additionally, the processor 315 may initialize the position of the delay element 317 to increase the available range of adjustments to the optical path length. When initialized, the processor 315 may measure the initial coincidence rate detected by the processor 315 of the interferometer. After measuring the initial coincidence rate, the processor 315 may direct the delay element 317 to gradually increase the length of the second optical path 331 until the processor 315 measures a threshold coincidence rate (e.g., fifty percent of the initially measured coincidence rate). When the measured coincidence dips below the threshold coincidence rate, or the measured coincidence rate becomes less than a threshold fraction of the initial coincidence rate, the processor 315 may determine that the lengths of the optical paths 329 and 331 for the twin photons are substantially equal.

Alternatively, the processor 315 may initialize the position of the delay element 317 to enable decreasing the length of the second optical path 331. For example, the processor 315 may direct the delay element 317 to decrease the length of the second optical path 331 until the measured coincidence rate is substantially equal to a threshold coincidence rate. In alternative embodiments, the processor 315 may direct the delay element 317 to gradually increase or decrease the optical path length to identify a smallest acquired measurement of the coincidence rate within the HOM dip.

In some embodiments, when the processor 315 determines that the optical path lengths are substantially equal as described above, the processor 315 may monitor the measured coincidence rate and send electrical signals to the delay element 317 to maintain substantially equal optical path lengths. For example, when the delay element 317 initially increases the length of the second optical path 331 to observe the threshold fraction, if the measured coincidence rate decreases, the processor 315 may determine that the length of the second optical path 331 is increasing. Accordingly, the processor 315 may direct the delay element 317 to decrease the length of the second optical path 331 to maintain the measured coincidence rate at the threshold fraction. Conversely, if the measured coincidence rate increases, the processor 315 may determine that the length of the second optical path 731 is decreasing. Accordingly, the processor 315 may direct the delay element 317 to increase the length of the second optical path 331 so that the measured coincidence rate decreases toward the threshold fraction.

In an alternative embodiment, when the delay element 317 initially decreased the length of the second optical path 331 to observe the threshold fraction, if the measured coincidence rate decreases, the processor 315 may determine that the length of the second optical path 331 is decreasing. Accordingly, the processor 315 may direct the delay element 317 to increase the length of the second optical path 331 to maintain the measured coincidence rate at the threshold fraction. Conversely, if the measured coincidence rate increases, the processor 315 may determine that the length of the second optical path 331 is increasing. Accordingly, the processor 315 may direct the delay element 317 to decrease the length of the second optical path 331 to maintain the measured coincidence rate at the threshold fraction.

In some embodiments, elements of the optical source 306 may be disposed upon a microchip having communication paths between the various components on the chip. Alternatively, the different components of the optical source 306 may be separate modules in communication with one another.

Figure 4:
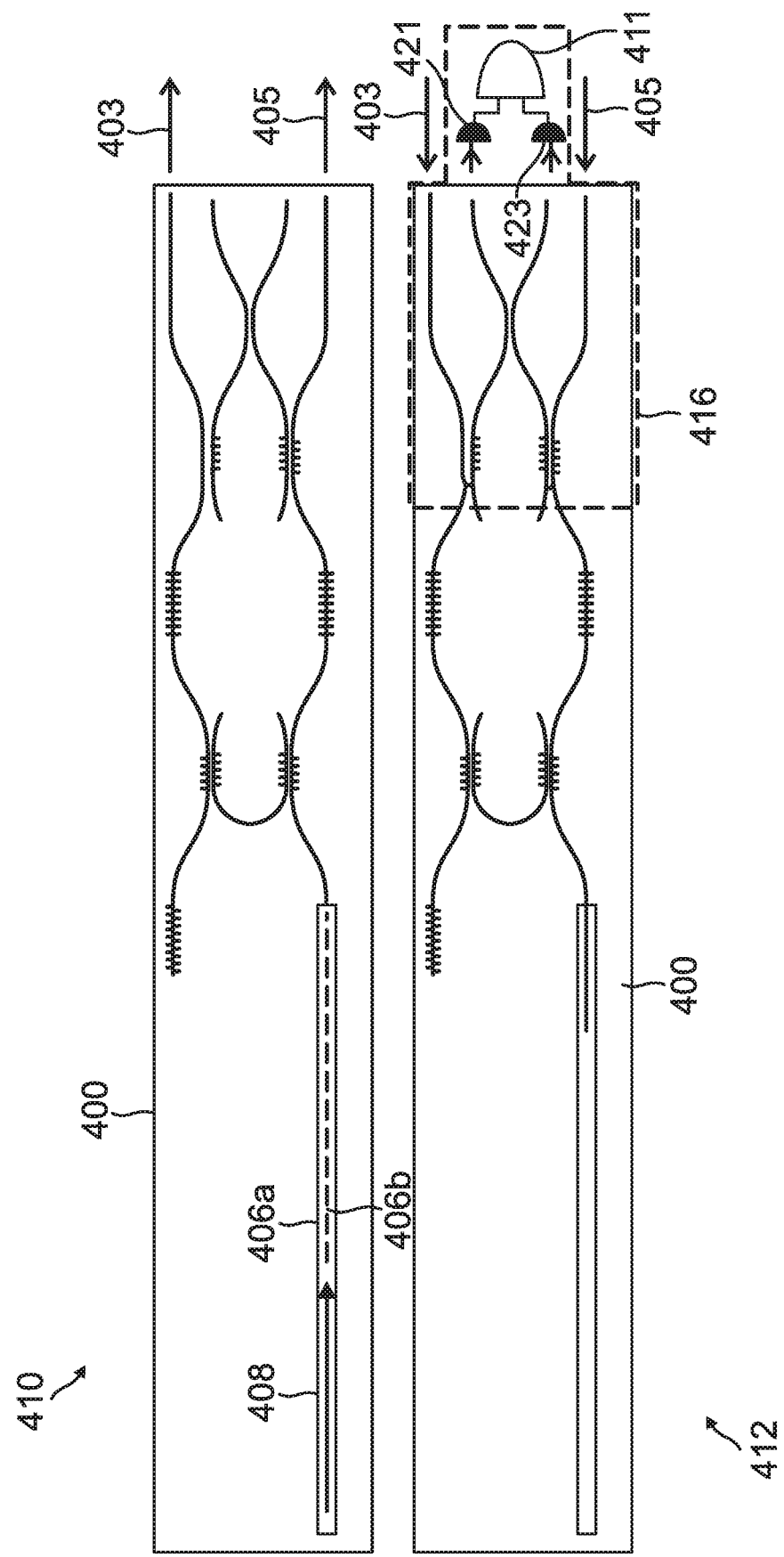
FIG. 4 is a diagram illustrating different paths in a chip-scale device according to an aspect of the present disclosure.

FIG. 4 illustrates different paths of photons through a chip-scale device 400 that is both capable of generating a photon, splitting the photon into twin photons, providing the twin photons to remote reflectors, receiving the photons from the remote reflectors, and providing the received photons to an interferometer for performing HOM interferometry. Accordingly, the chip-scale device 400 illustrates one embodiment of a chip-scale device 400 containing certain components of the optical source and receiver 206 described above in FIG. 2. In particular, the photon source 301 and other components shown in FIG. 3 facilitate the emission and reception of photons to the remote reflectors 307 and 309, the delivery of received photons to the mode combiner 333, the delivery of output ports from the mode combiner 333 to photodetectors 311-1 and 311-2, and the delivery of electrical signals to a timing module 313. While the components are shown as being part of a chip-scale device, the components may likewise be implemented using separate components that are coupled to one another using optical transmission media.

As shown, FIG. 4 illustrates a source path 410 and an interferometer path 412 through the chip-scale device 400. In the source path 410, a photon is generated and split into twin photons 403 and 405 for use by different remote reflectors. In the interferometer path 412, the twin photons 403 and 405 are received from the remote reflectors and provided to a timing module 411.

In certain embodiments, the chip-scale device 400 utilizes the nonlinear optical effect of degenerate spontaneous parametric down-conversion (dSPDC), in which a pump photon 408 splits into two "twin" twin photons 406a and 406b that are "born" at nearly the same instant (e.g., within <100 femtoseconds of one another). This simultaneity, enforced by quantum mechanics, may be exploited for synchronizing separated atomic clocks. To synchronize the separated atomic clocks (i.e., when the different atomic clocks are located on different satellites or associated with other types of remote reflectors), the synchronization is achieved by projecting twin photons 403 and 405 from the chip-scale device 400; reflecting some of the photons 403 and 405 from each of the remote reflectors; and providing them for recombination in a Hong-Ou-Mandel (HOM) interferometer, where a purely quantum mechanical interference "dip" in the coincidence rate is observed when the paths are substantially equal as described above with respect to FIGS. 1-3. The arrival times of some of the entangled photons from each satellite are correlated over a classical channel, enabling the clocks to be synchronized with high precision (i.e., potentially with femtosecond precision).

In some embodiments, the chip-scale device 400 is a chip-scale photonic integrated circuit that produces and interferes time-entangled photons. The chip-scale device 400 may include optical functions and components on a hybrid optical waveguide platform which combines the nonlinear properties of ppKTP waveguides (or other waveguides made from materials having similar properties) with the high confinement and filtering capabilities of silicon nitride waveguides.

In further embodiments, the chip-scale device 400 may generate a pump photon 408. From the pump photon 408, the chip-scale device 400 may generate a high flux of time-energy entangled twin photons via continuous wave (CW) pumped Type II degenerate spontaneous parametric down conversation (dSPDC) in a photon providing waveguide (such as a ppKTP waveguide or waveguide made from similarly capable material. The twin photon state (also known as the bi-photon state, or the "2002" state) may have robust time-spectral entanglement and is an ideal quantum system for synchronizing time between clocks on remote satellites, as it is not easily decohered due to absorption or loss, and the transmission channel (free space) is naturally free of dispersion.

In additional embodiments, the chip-scale device 400 may provide a hybrid waveguide platform that combines the nonlinear optical capabilities of the photons providing waveguides with the tight guiding and filtering capabilities of photonics-component waveguides. This combination permits miniaturization, efficiency, and robustness while increasing the useable flux of the twin photons 406a and 406b (emitted from the chip-scale device as photons 403 and 405).

In certain embodiments, in the source path 401, twin photons 406a and 406b are created via dSPDC in the photon-providing waveguide. Each of the twin photons 406a and 406b may occupy a different waveguide mode, either Transverse Electric (TE) or Transverse Magnetic (TM). A Vertical Coupler (VC) region may adiabatically draw the bi-photons out of the photon-providing waveguide and into a photonics-component waveguide patterned on top of the photon-providing waveguide. Additionally, the TM and TE photons may be separated by two diffractive waveguide mode splitters (MS). The TE photon may then pass through a bandpass filter (BPF) to reject background photons, through a second MS, then leaves the chip as twin photon 405. Also, the original TM photon is converted into a TE mode by a diffractive mode converter (MC), which also reverses its direction of propagation. The now TE polarized photon passes through a BPF and leaves the chip as twin photon 403. The various functions performed on the chip may be performed by a photonics-component waveguide (in some embodiments, made from silicon nitride or other similar material), where waveguide structures are patterned in a film deposited on top of the substrate containing the photon-providing waveguide.

In additional embodiments, in the interferometer path 416, the twin photons 403 and 405 may be reflected from the remote reflectors. The twin photons 403 and 405 may be recoupled into the photonics-component waveguides on the chip-scale device 400 to be provided to a HOM interferometer. (In some implementations, the photons may also have their polarizations rotated by 90 degrees by conventional waveplates). Although the twin photons 403 and 405 re-enter the same waveguides from which they were earlier emitted, because of their now rotated polarizations, they couple into the orthogonal waveguide mode (i.e., TM). Each of the twin photons 403 and 405 may then interact with an MS that reverses their respective direction of propagation within the waveguide, passing the twin photons 403 and 405 through reflection ports of a respective diffractive mode splitter towards a 50/50 waveguide coupler, where coincident twin photons may recombine. The photons that fail to recombine may then pass out of the chip-scale device 400 for detection by photodetectors 421 and 423 and subsequent interferometry performed by the timing module 411. The chip-scale device 400 and components contained therein are described in greater detail in U.S. Non-Provisional application Ser. No. 16/803,841, filed Feb. 27, 2020, and titled "INTEGRATED PHOTONICS SOURCE AND DETECTOR OF ENTANGLED PHOTONS;" U.S. Non-Provisional application Ser. No. 16/803,820, filed Feb. 27, 2020, and titled "INTEGRATED PHOTONICS MODE SPLITTER AND CONVERTER;" and U.S. Non-Provisional application Ser. No. 16/803,831, filed Feb. 27, 2020, and titled "INTEGRATED PHOTONICS VERTICAL COUPLER," all of which are incorporated herein by reference.

Figure 5:
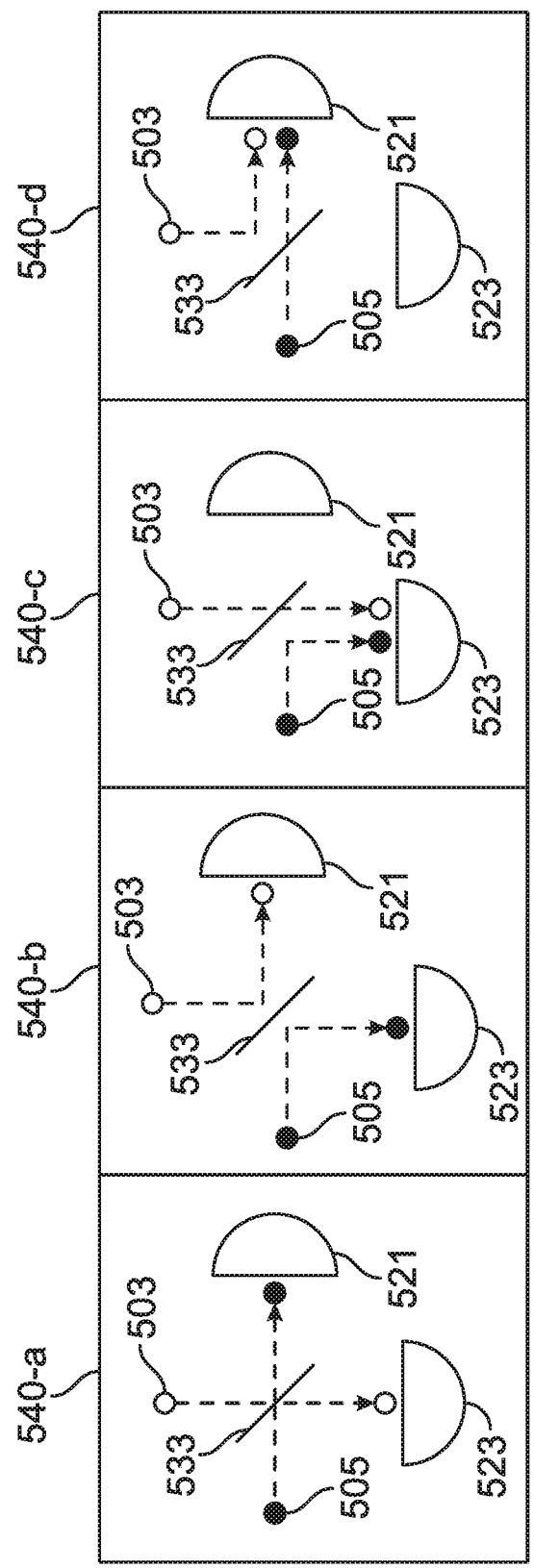
FIG. 5 is a diagram illustrating different optical paths for the reception of photon pairs according to an aspect of the present disclosure.

FIG. 5 is a diagram illustrating various combinations 540 in which twin photons 503 and 505 may be detected by photodetectors 521 and 523. As described above, a system may include a mode combiner 533 that directs twin photons 503 and 505 to one of two photodetectors 521 and 523. In some embodiments, the first twin photon 503 may be described as a signal photon 503, and the second twin photon 505 may be described as an idler photon 505. As described above, the signal photon 503 may be projected along a first optical path, and the idler photon 505 may be projected along a second optical path. The first optical path may direct the signal photon 503 towards a first remote reflector, such as a satellite equipped with retro reflection optics, and the second optical path may direct the idler photon 505 towards a second remote reflector. Both the signal photon 503 and the idler photon 505 are reflected back towards the source and coupled into the mode combiner 533 (such as a 50/50 mode combiner described above as part of the optical source and receiver 206 in FIG. 2). As described above, mode combiner 533 may have two output ports directed to two photodetectors 521 and 523. In some implementations, the photodetectors 521 and 523 may be single-photon avalanche photodetectors; however, other types of photodetectors may be used. The photodetectors 521 and 523 may provide electrical signals that are analyzed by a time difference counter, such as could be found as part of the timing module 213 in FIG. 2.

At times, the first optical path of the signal photon 503 may be shorter than the second optical path of the idler photon 505. Accordingly, the flight time of the signal photon 503 may be shorter than the flight time of the idler photon 505. At other times, the second optical path of the idler photon 505 may be shorter than the first optical path of the signal photon 503. Accordingly, the flight time of the idler photon 505 may be shorter than the flight time of the signal photon 503. When a flight time is shorter, the associated photon may be incident on one of the photodetectors 521 and 523 before the other photon is incident on one of the photodetectors 521 of 523. For example, when the flight time of the signal photon 503 is shorter than the flight time of the idler photon 505, the signal photon 503 will be incident on one of the photodetectors 521 and 523 before the idler photon is incident on one of the photodetectors 521 and 523. Conversely, when the flight time of the idler photon 505 is shorter than the flight time of the signal photon 503, the idler photon 505 will be incident on one of the photodetectors 521 and 523 before the signal photon 503.

When a signal photon 503 is incident on one of the photodetectors 521 and 523, the signal photon 503 may randomly be incident on one of the photodetectors 521 and 523. Similarly, when an idler photon 505 is incident on one of the photodetectors 521 and 523, the idler photon 505 may randomly be incident on one of the photodetectors 521 and 523. Accordingly, an associated signal photon 503 and idler photon 505 may be incident upon the photodetectors 521 and 523 in one of the combinations 540-a-540-d. As the signal photon 503 and the idler photon 505 are each randomly incident on the photodetectors 521 and 523, each of the combinations 540-a-540-d may substantially have a 25% chance of occurring.

In combination 540-a, the signal photon 503 and the idler photon 505 both pass through the mode combiner 533 and are incident on different photodetectors 521 and 523. Specifically, the signal photon 503 may pass through the mode combiner 533 and be incident upon the second photodetector 523 at a second photodetector detection time. The idler photon 505 may pass through the mode combiner 533 and be incident upon the first photodetector 521 at a first photodetector detection time. The photodetectors 521 and 523 may provide their signals to a timing module, where the signals contain information describing the first photodetector detection time and the second photodetector detection time. The timing module may calculate a time difference that is equal to the first photodetector detection time minus the second photodetector time.

In combination 540-b, the signal photon 503 and the idler photon 505 may both be reflected by the mode combiner 533 and are incident on different photodetectors 521 and 523. Specifically, the signal photon 503 may be reflected by the mode combiner 533 and be incident upon the first photodetector 521 at a first photodetector detection time. The idler photon 505 may be reflected by the mode combiner 533 and be incident upon the second photodetector 523 at a second photodetector detection time. The photodetectors 521 and 523 may provide their signals to a timing module, where the signals contain information describing the first photodetector detection time and the second photodetector detection time. The timing module may calculate a time difference that is equal to the first photodetector detection time minus the second photodetector time.

In combinations 540-c and 540-d, the signal photon 503 and the idler photon 505 may be incident on the same photodetector. For example, in combination 540-c, the signal photon 503 may pass through the mode combiner 533 and the idler photon 505 may be reflected by the mode combiner 533. Accordingly, both the signal photon 503 and the idler photon 505 are incident on the second photodetector 523. Alternatively, in combination 540-d, the signal photon 503 may be reflected by the mode combiner 533 and the idler photon 505 may pass through the mode combiner 533. Accordingly, both the signal photon 503 and the idler photon 505 are incident on the first photodetector 523. When the signal photon 503 and the idler photon 505 are incident on the same photodetector, a timing module will not receive separate signals from the first photodetector 521 and the second photodetector 523 from which to infer relative timing information.

As described above, when the signal photon 503 and the idler photon 505 arrive at different times, the combination 540-a may cause the timing module to measure the arrival time of the idler photon 505 minus the arrival time of the signal photon 503. Also, the combination 540-b may cause the timing module to measure the arrival time of the signal photon 503 minus the arrival time of the idler photon 505. The timing module may not acquire information from the combinations 540-c and 540-d. Accordingly, the measurements of the timing module may produce two clusters of results that are substantially equal in magnitude but opposite in sign, where the magnitude of the measurements is proportional to the difference in optical length between the paths.

Figure 6:
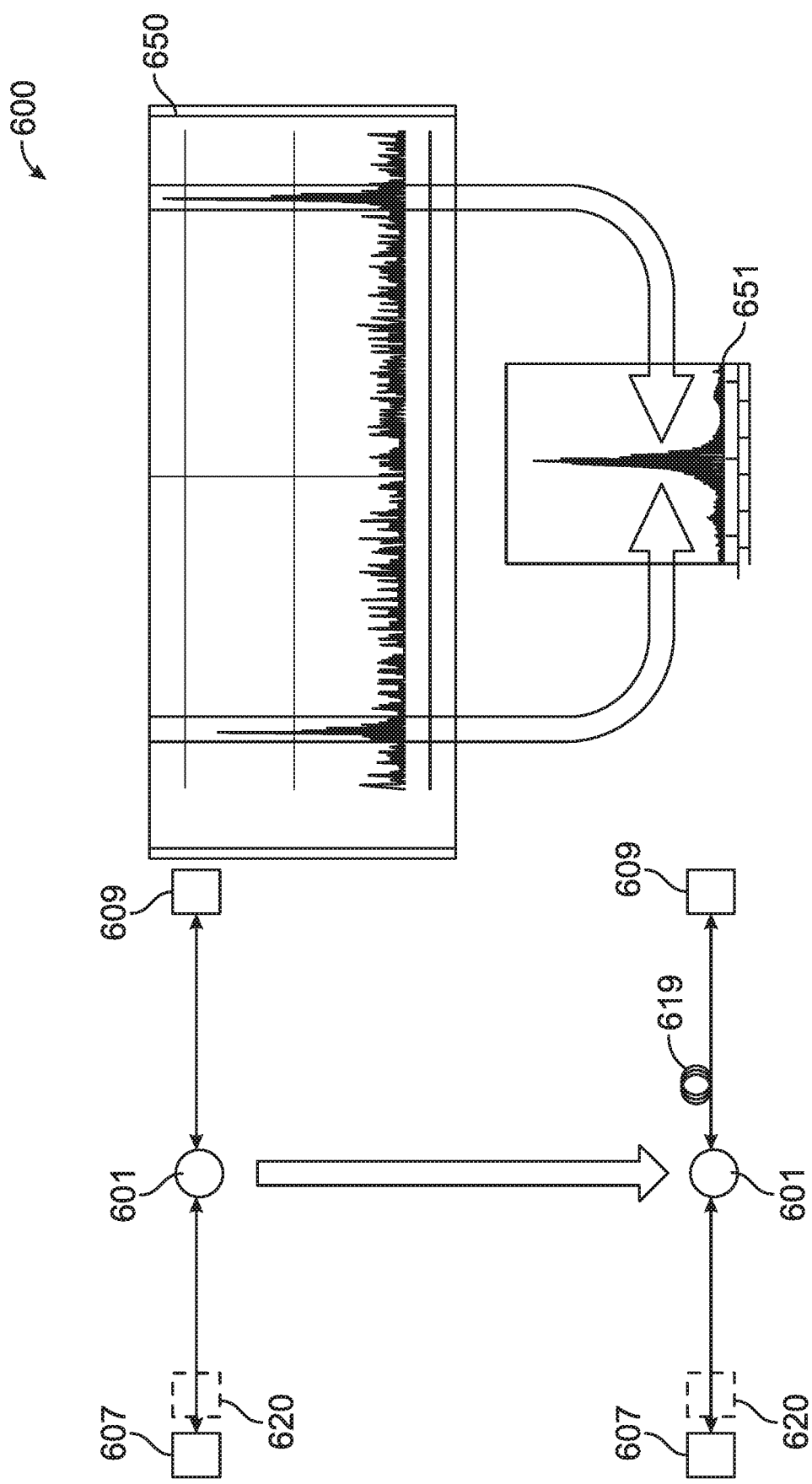
FIG. 6 is a diagram illustrating a system for adjusting optical paths having large delays according to an aspect of the present disclosure.

FIG. 6 is a block diagram of a system 600 for adjusting path lengths based on measurements from a timing module. As described above, the timing module may produce two clusters of results for the measurements of the time differences of the twin photons measured at the different photodetectors. The timing module may provide the results of the measurements to a processor that may perform a statistical analysis of the recorded time differences. The graph 650 is a histogram of the time differences measured by the timing module. The graph 650 shows two clusters of measurements that are substantially symmetric about the time of simultaneous arrival of the twin photons. The processor may perform a double peak fit or other mathematical process to extract a time delay from the histogram. The processor may use the extracted information to implement a coarse adjustment to remove the time delay between the different optical paths of the twin photons such that the histogram of the results of the time differences measured by the timing module has a single cluster at the time of simultaneous arrival of the twin photons as shown in graph 651.

In certain embodiments, to implement the coarse adjustment, the system 600 includes a photon source 601 that provides twin photons to remote reflectors 607 and 609. Specifically, the photon source 601 may provide a first photon to the remote reflector 607 and a second photon to the remote reflector 609. As shown, some unknown path length difference 620 may exist on the optical path of the first photon between the photon source 601 and the remote reflector 607. Due to the path length difference 620, the timing module on the photon source may measure a difference in the time that the first photon and the second photon are incident upon the photodetectors on the photon source. Accordingly, the processor may observe two clusters of measurements that are substantially symmetric about the time of simultaneous arrival. The processor may then extract the time delay from the measurements provided by the timing module. For example, the width between the clusters of measurements may be equal to twice the delay that results from the path length difference 620. The processor may then add a delay 619 to the shorter of the optical paths, such that the different optical paths between the photon source 601 and the remote reflector 607 and 609 are substantially equal. In some embodiments, the paths are substantially equal when the path length difference after the added delay 619 is within the adjustment range of a fine adjuster, such as the fine adjuster 217.

In some embodiments, the processor may be able to calculate the magnitude of the delay but not the sign of the delay from the information provided by the timing module. To determine the sign of the delay (which optical path should be delayed through the insertion of an added delay 619), the processor may add the additional delay to one of the two optical paths between the photon source 601 and the two remote reflectors 607 and 609. After the additional delay 619 is added to one of the paths, the processor may again determine if the timing module measures a difference in the time of incidents. If the measurements provided by the timing module result in two clusters of measurements that are separated by twice the original delay that existed in the optical path before the addition of the delay 619, the processor may determine that the delay 619 was added to the wrong optical path. Accordingly, the processor may then remove the delay 619 and insert the delay 619 to the other optical path, such that the histogram of the results of the time differences measured by the timing module has a single cluster at the time of simultaneous arrival of the twin photons as shown in graph 651. Alternatively, if the measurements provided by the timing module result in a single cluster of measurements at the time of simultaneous arrival, the processor may determine that the delay 619 was added to the correct optical path.

In further embodiments, the delay 619 may be added as a series of discrete optical path lengths. For example, the system 600 may be capable of inserting a large delay 619 into one or both of the optical paths. The delay 619 may be inserted using discrete optical delay elements of various lengths. For example, the delay 619 may be any combination of optical fiber, mirrors, or other optical devices. Additionally, the delay 619 may include insertable optical fiber sections having lengths of 100 m, 10 m, 1 m, 1 cm, etc. Also, the delay 619 may include adjustable mirrors that can reflect light between the mirrors a desired number of times to delay light propagating therebetween as determined by the angle of the mirrors, where the angle of the mirrors in relation to one another is controlled by the processor. Other delay elements may be used to control the length of the delay 619, such as piezoelectric transducers, adjustable prisms, and the like.

As such, using various lengths of delay, the processor may remove the path length difference between the multiple optical paths such that a fine adjuster can synchronize the optical paths within a HOM dip as described above in relation to FIG. 3.

In certain embodiments, when the photon source 601 is moving relative to one or both of the remote reflectors 607 and 609, the processor may make adjustments to the delay 619 to keep the optical path lengths substantially equal. For example, if the processor determines that there is more than one cluster of measurements, the processor may adjust the length of the delay 619. Alternatively, the processor may adjust the delay 619 when the processor is unable to resolve the differences in the optical path length as detected by the fine adjuster.

Figure 7:
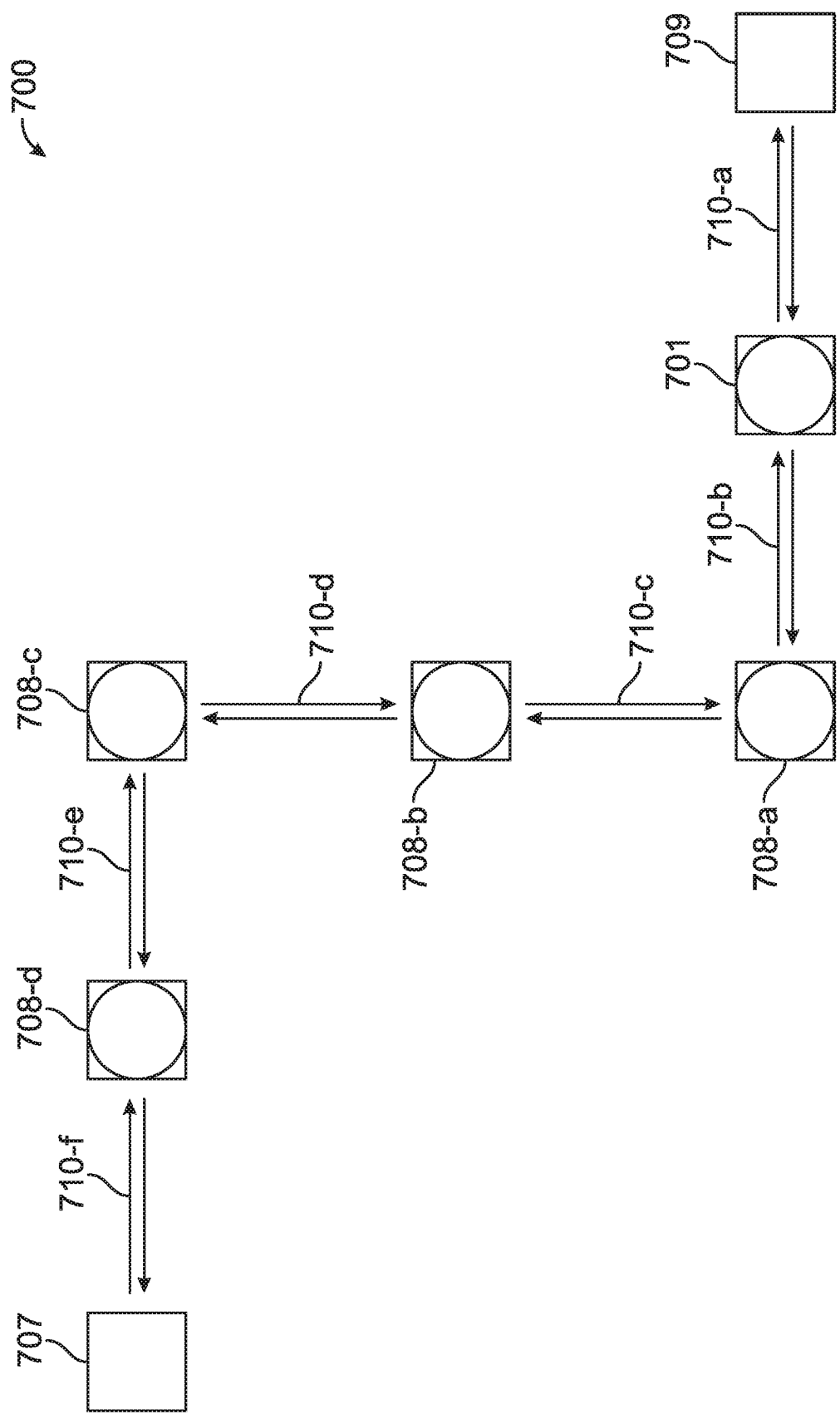
FIG. 7 is a block diagram illustrating a network of optical sources and remote reflectors according to an aspect of the present disclosure.

FIG. 7 is a block diagram of a network 700 of optical devices that implement the systems and methods described above to synchronize multiple systems in the network 700. As illustrated, the network 700 may include a first optical source 701. In certain embodiments, the first optical source 701 functions as an optical source that initializes synchronization of the various nodes of the network 700. As such, the first optical source 701 operates as a node in the network that functions solely as a source of entangled photon pairs and not solely as an endpoint for reflecting photons. In other embodiments, the first optical source 701 functions as both a source of entangled photon pairs and an endpoint for reflecting photon pairs. As such, the first optical source 701 functions as a multifunction node that functions as both the endpoint and source of entangled photons. Additionally, the network 700 may include endpoint nodes 707 and 709, which function similarly to the remote reflectors described above. Further, the network 700 may include multifunction nodes 708-a-708-d (referred to generally and collectively as multifunction nodes 708) that function as both endpoints and sources of entangled photon pairs.

In certain embodiments, to begin synchronization, the first optical source 701 operating as a first multifunction node 701 may synchronize the optical path 710-a, between the first multifunction node 701 and the endpoint node 709, with the optical path 710-b, between the first multifunction node 701 and the multifunction node 708-a. The first multifunction node 701 may synchronize the optical paths 710-a with 710-b using combinations of the coarse adjustments and the fine adjustments described above. When the optical path 710-a is synchronized with the optical path 710-b, the multifunction node 708-a may then act as an optical source using multifunction node 708-b and the first multifunction node 701 as a reflector to synchronize the optical path 710-c with the optical path 710-b substantially as described above. Similarly, multifunction node 708-b synchronizes the optical path 710-d with the optical path 710-c, the multifunction node 708-c synchronizes the optical path 710-e with the optical path 710-d, and the multifunction node 708-d synchronizes the optical path 710-f with the optical path 710-e.

Figure 8:
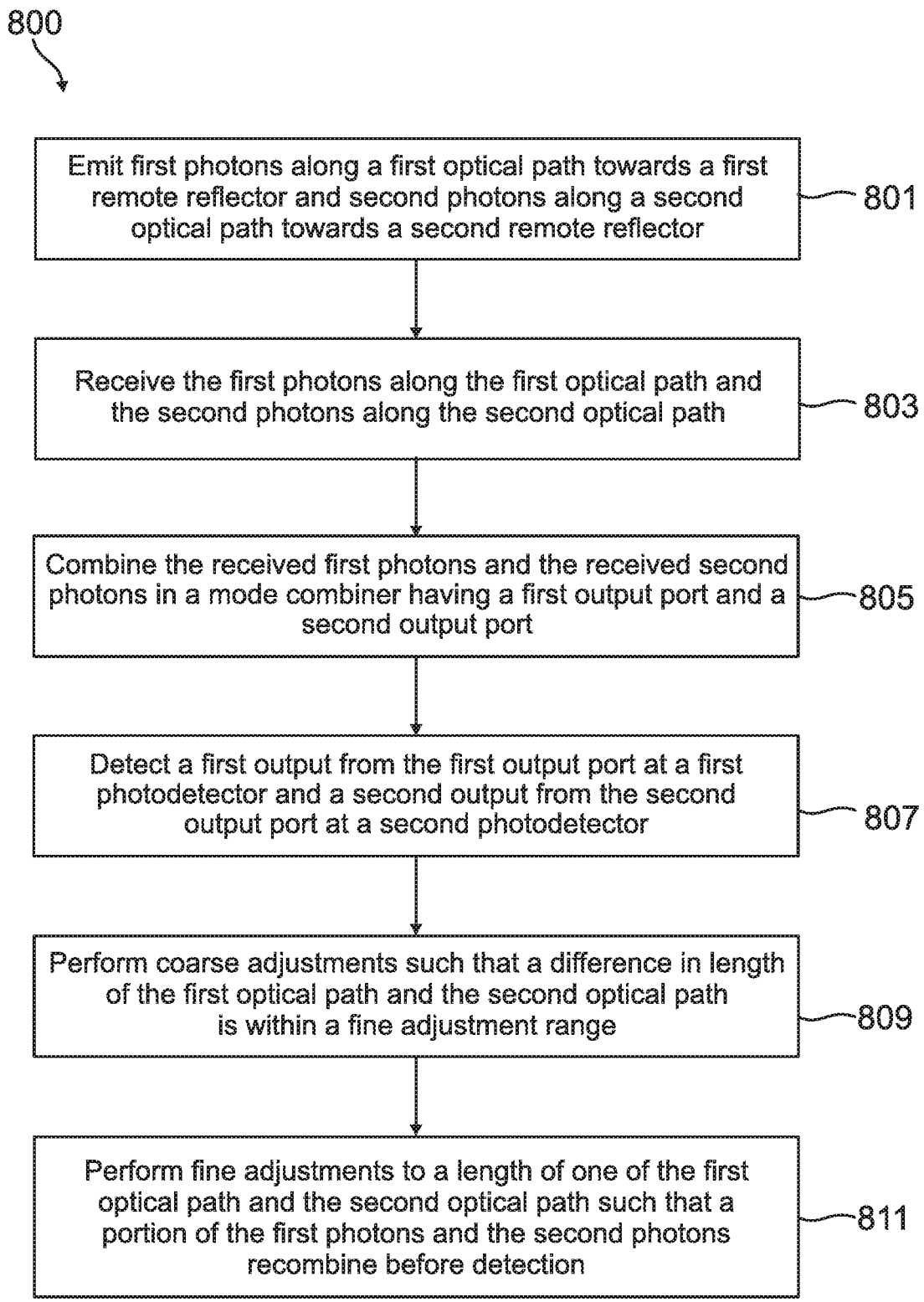
FIG. 8 is a flowchart diagram of a method for dynamic optical interferometer locking using entangled photons according to an aspect of the present disclosure.

FIG. 8 is a flowchart diagram of a method 800 for dynamic optical interferometer locking using entangled photons. As shown, the method 800 proceeds at 801, where first photons are emitted along a first optical path towards a first remote reflector and second photons are emitted along a second optical path towards a second remote reflector. Further, the method 800 proceeds at 803, where the first photons are received along the first optical path and the second photons are received along the second optical path. Additionally, the method 800 proceeds at 805, where the received first photons and the received second photons are combined in a mode combiner having a first output port and a second output port.

In certain embodiments, the method 800 proceeds at 807, where a first output from the first output port is detected at a first photodetector, and a second output from the second output port is detected at a second photodetector. Also, the method 800 proceeds at 809, where coarse adjustments are performed such that a difference in length of the first optical path and the second optical path is within a fine adjustment range. Moreover, the method 800 proceeds at 811, where fine adjustments are performed to a length of one of the first optical path and the second optical path such that a portion of the first photons and the second photons recombine before detection.

EXAMPLE EMBODIMENTS

Example 1 includes a system comprising: an optical source for generating a pair of simultaneously produced photons; a first emitter/receiver that emits a first photon in the pair of photons towards a first remote reflector and receives a reflected first photon along a first optical path; a second emitter/receiver that emits a second photon in the pair of photons towards a second remote reflector and receives a reflected second photon along a second optical path; a mode combiner for combining the reflected first photon and the reflected second photon into a first output port and a second output port; a coarse adjuster that performs coarse adjustments to the first optical path and the second optical path; a fine adjuster that performs fine adjustments to the first optical path and the second optical path; a plurality of photodetectors that detect photons from the first output port and photons from the second output port; and a processor that executes executable code that causes the processor to control the coarse adjustments and the fine adjustments based on received signals from the plurality of photodetectors, wherein the coarse adjustments are greater than the fine adjustments.

Example 2 includes the system of Example 1, wherein the processor controls the coarse adjustments based on a time delay between arrival of signals from the plurality of photodetectors.

Example 3 includes the system of any of Examples 1-2, wherein the processor controls the fine adjustments based on a detected coincidence rate.

Example 4 includes the system of Example 3, wherein, during initialization, the processor identifies the detected coincidence rate as an initial coincidence rate and directs the fine adjuster to gradually increase a length of one of the first optical path and the second optical path until the detected coincidence rate is substantially equal to a threshold fraction of the initial coincidence rate.

Example 5 includes the system of Example 4, wherein the processor directs the fine adjuster to change the length when the detected coincidence rate changes from the threshold fraction.

Example 6 includes the system of any of Examples 1-5, wherein the coarse adjustments comprise discrete changes to a length of at least one of the first optical path and the second optical path.

Example 7 includes the system of any of Examples 1-6, wherein the fine adjustments comprise continuous changes to a length of one of the first optical path and the second optical path.

Example 8 includes the system of any of Examples 1-7, further comprising a mechanical translation stage coupled into one of the first optical path and the second optical path, wherein the processor controls the fine adjustments by sending electrical signals to the mechanical translation stage, wherein the mechanical translation stage adjusts positions of optical components along one of the first optical path and the second optical path.

Example 9 includes the system of any of Examples 1-8, wherein the processor directs the coarse adjuster to perform coarse adjustments until a difference in optical length is within an adjustment range of the fine adjuster.

Example 10 includes a method comprising: emitting first photons along a first optical path towards a first remote reflector and second photons along a second optical path towards a second remote reflector, wherein the first photons and the second photons are entangled photons; receiving the first photons along the first optical path and the second photons along the second optical path; combining the received first photons and the received second photons in a mode combiner having a first output port and a second output port; detecting a first output from the first output port at a first photodetector and a second output from the second output port at a second photodetector; performing coarse adjustments such that a difference in length of the first optical path and the second optical path is within a fine adjustment range; and performing fine adjustments to a length of one of the first optical path and the second optical path such that a portion of the first photons and the second photons recombine before detection.

Example 11 includes the method of Example 10, wherein performing the fine adjustments comprises: measuring an initial coincidence rate of the first photons and the second photons; and increasing the length of one of the first optical path and the second optical path until the measured coincidence rate of the first photons and the second photons is at a threshold fraction of the initial coincidence rate.

Example 12 includes the method of any of Examples 10-11, wherein performing the fine adjustments comprises sending control signals to a mechanical translation stage, wherein the mechanical translation stage responds to the control signals by changing distances between optical components along one of the first optical path and the second optical path.

Example 13 includes the method of any of Examples 10-12, further comprising: detecting a change in the difference in length of the first optical path and the second optical path; determining whether fine adjustments are performable to cause a coincidence rate of the first photons and the second photons to be within a Hong-Ou-Mandel dip; when fine adjustments are performable, performing additional fine adjustments to cause the coincidence rate of the first photons and the second photons to be within the Hong-Ou-Mandel dip; and when fine adjustments are not performable, performing a coarse adjustment to cause the difference in length to be within the fine adjustment range.

Example 14 includes the method of Example 13, wherein determining whether fine adjustments are performable comprises determining that the additional fine adjustments are within the fine adjustment range.

Example 15 includes the method of any of Examples 10-14, wherein performing the coarse adjustments comprises performing discrete changes to the length of at least one of the first optical path and the second optical path.

Example 16 includes the method of any of Examples 10-15, wherein performing the fine adjustments comprises performing continuous changes to the length of one of the first optical path and the second optical path.

Example 17 includes a system comprising: an optical source for generating a pair of simultaneously produced photons; a first emitter/receiver that emits a first photon in the pair of simultaneously produced photons towards a remote reflector and receives a reflected first photon along a first optical path; a second emitter/receiver that emits a second photon in the pair of simultaneously produced photons towards a remote reflector and receives a reflected second photon along a second optical path; a mode combiner which combines the reflected first photon from the first optical path and the reflected second photon from the second optical path; a plurality of photodetectors that detect a first output from a first output port of the mode combiner and a second output from a second output port of the mode combiner; a coarse adjuster that performs coarse adjustments to at least one of the first optical path and the second optical path based on a difference in arrival times of signals from the plurality of photodetectors; and a fine adjuster that performs fine adjustments to at least one of the first optical path and the second optical path based on a coincidence rate of the reflected first photon and the reflected second photon.

Example 18 includes the system of Example 17, further comprising a timing module, wherein, during initialization, the timing module measures an initial coincidence rate, wherein the fine adjuster gradually increases a length of one of the first optical path and the second optical path until the timing module measures the coincidence rate as being substantially equal to a threshold fraction of the initial coincidence rate.

Example 19 includes the system of any of Examples 17-18, wherein the fine adjuster comprises a mechanical translation stage coupled into one of the first optical path and the second optical path, wherein the mechanical translation stage adjusts positions of optical components along one of the first optical path and the second optical path in response to control signals.

Example 20 includes the system of any of Examples 17-19, wherein the coarse adjustments comprise discrete changes to a length of at least one of the first optical path and the second optical path; and wherein the fine adjustments comprise continuous changes to the length of one of the first optical path and the second optical path.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
   an optical source for generating a pair of simultaneously produced photons;
   a first emitter/receiver that emits a first photon in the pair of photons towards a first remote reflector and receives a reflected first photon along a first optical path;
   a second emitter/receiver that emits a second photon in the pair of photons towards a second remote reflector and receives a reflected second photon along a second optical path;
   a mode combiner for combining the reflected first photon and the reflected second photon into a first output port and a second output port;
   a coarse adjuster that performs coarse adjustments to the first optical path and the second optical path;
   a fine adjuster that performs fine adjustments to the first optical path and the second optical path;
   a plurality of photodetectors that detect photons from the first output port and photons from the second output port; and
   a processor that executes executable code that causes the processor to:
      control the coarse adjustments and the fine adjustments based on received signals from the plurality of photodetectors until a coincidence rate of the detection of the pair of photons dips toward zero, wherein the coarse adjustments are greater than the fine adjustments;
      monitoring the coincidence rate to identify when the coincidence rate changes away from zero; and
      directing at least one of the coarse adjuster to perform additional coarse adjustments and the fine adjuster to perform additional fine adjustments until the coincidence rate dips again toward zero.

2. The system of claim 1, wherein the processor controls the coarse adjustments based on a time delay between arrival of signals from the plurality of photodetectors.

3. The system of claim 1, wherein the processor controls the fine adjustments based on a detected coincidence rate.

4. The system of claim 3, wherein, during initialization, the processor identifies the detected coincidence rate as an initial coincidence rate and directs the fine adjuster to gradually increase a length of one of the first optical path and the second optical path until the detected coincidence rate is substantially equal to a threshold fraction of the initial coincidence rate.

5. The system of claim 4, wherein the processor directs the fine adjuster to change the length when the detected coincidence rate changes from the threshold fraction.

6. The system of claim 1, wherein the coarse adjustments comprise discrete changes to a length of at least one of the first optical path and the second optical path.

7. The system of claim 1, wherein the fine adjustments comprise continuous changes to a length of one of the first optical path and the second optical path.

8. The system of claim 1, further comprising a mechanical translation stage coupled into one of the first optical path and the second optical path, wherein the processor controls the fine adjustments by sending electrical signals to the mechanical translation stage, wherein the mechanical translation stage adjusts positions of optical components along one of the first optical path and the second optical path.

9. The system of claim 1, wherein the processor directs the coarse adjuster to perform coarse adjustments until a difference in optical length is within an adjustment range of the fine adjuster.

10. A method comprising:
    emitting first photons along a first optical path towards a first remote reflector and second photons along a second optical path towards a second remote reflector, wherein the first photons and the second photons are entangled photons;

receiving the first photons along the first optical path and the second photons along the second optical path;

combining the received first photons and the received second photons in a mode combiner having a first output port and a second output port;

detecting a first output from the first output port at a first photodetector and a second output from the second output port at a second photodetector;

performing coarse adjustments such that a difference in length of the first optical path and the second optical path is within a fine adjustment range;

performing fine adjustments to a length of one of the first optical path and the second optical path such that a portion of the first photons and the second photons recombine before detection;

detecting a change in the difference in length of the first optical path and the second optical path that causes a coincidence rate of the first photons and the second photons to move away from a Hong-Ou-Mandel dip; and making at least one of additional fine adjustments and additional coarse adjustments to bring the coincidence rate of the first photons and the second photons to be within the Hong-Ou-Mandel dip.

11. The method of claim 10, wherein performing the fine adjustments comprises:

measuring an initial coincidence rate of the first photons and the second photons; and increasing the length of one of the first optical path and the second optical path until the measured coincidence rate of the first photons and the second photons is at a threshold fraction of the initial coincidence rate.

12. The method of claim 10, wherein performing the fine adjustments comprises sending control signals to a mechanical translation stage, wherein the mechanical translation stage responds to the control signals by changing distances between optical components along one of the first optical path and the second optical path.

13. The method of claim 10, wherein making the at least one of the additional fine adjustments and the additional coarse adjustments further comprises:

determining whether fine adjustments are performable to cause a coincidence rate of the first photons and the second photons to be within a Hong-Ou-Mandel dip;

when fine adjustments are performable, performing additional fine adjustments to cause the coincidence rate of the first photons and the second photons to be within the Hong-Ou-Mandel dip; and when fine adjustments are not performable, performing a coarse adjustment to cause the difference in length to be within the fine adjustment range.

14. The method of claim 13, wherein determining whether fine adjustments are performable comprises determining that the additional fine adjustments are within the fine adjustment range.

15. The method of claim 10, wherein performing the coarse adjustments comprises performing discrete changes to the length of at least one of the first optical path and the second optical path.

16. The method of claim 10, wherein performing the fine adjustments comprises performing continuous changes to the length of one of the first optical path and the second optical path.

17. A system comprising:

an optical source for generating a pair of simultaneously produced photons;

a first emitter/receiver that emits a first photon in the pair of simultaneously produced photons towards a remote reflector and receives a reflected first photon along a first optical path;

a second emitter/receiver that emits a second photon in the pair of simultaneously produced photons towards a remote reflector and receives a reflected second photon along a second optical path;

a mode combiner which combines the reflected first photon from the first optical path and the reflected second photon from the second optical path;

a plurality of photodetectors that detect a first output from a first output port of the mode combiner and a second output from a second output port of the mode combiner;

a coarse adjuster that performs coarse adjustments to at least one of the first optical path and the second optical path based on a difference in arrival times of signals from the plurality of photodetectors to bring the difference in length of the first optical path and the second optical path to be within a fine adjustment range; and a fine adjuster that performs fine adjustments to at least one of the first optical path and the second optical path based on a coincidence rate of the reflected first photon and the reflected second photon to cause the coincidence rate to be within a Hong-Ou-Mandel dip;

wherein at least one of the fine adjuster and the coarse adjuster make additional adjustments to at least one of the first optical path and the second optical path when the coincidence rate moves away from the Hong-Ou-Mandel dip to maintain the coincidence rate within the Hong-Ou-Mandel dip.

18. The system of claim 17, further comprising a timing module, wherein, during initialization, the timing module measures an initial coincidence rate, wherein the fine adjuster gradually increases a length of one of the first optical path and the second optical path until the timing module measures the coincidence rate as being substantially equal to a threshold fraction of the initial coincidence rate.

19. The system of claim 17, wherein the fine adjuster comprises a mechanical translation stage coupled into one of the first optical path and the second optical path, wherein the mechanical translation stage adjusts positions of optical components along one of the first optical path and the second optical path in response to control signals.

20. The system of claim 17, wherein the coarse adjustments comprise discrete changes to a length of at least one of the first optical path and the second optical path; and wherein the fine adjustments comprise continuous changes to the length of one of the first optical path and the second optical path.

* * * * *